April 19, 1966     E. H. LORENCE     3,246,351
TAP WITH CHIP REMOVAL MEANS
Filed Aug. 2, 1963
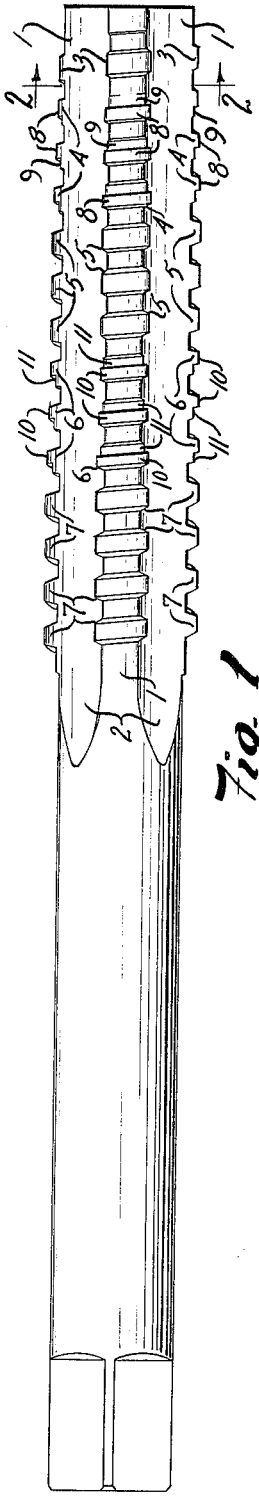
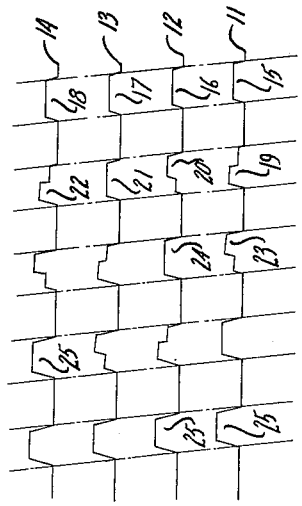
Fig. 4
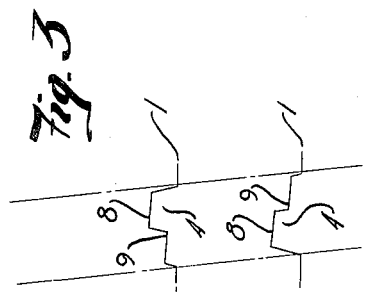
Fig. 3
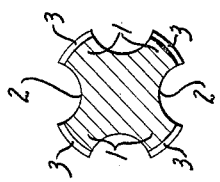
Fig. 2
INVENTOR.
ERVIN H. LORENCE
BY
Andrus & Starke
Attorneys United States Patent Office 3,246,351
Patented Apr. 19, 1966

3,246,351
TAP WITH CHIP REMOVAL MEANS
Ervin Henry Lorence, 9015 N. Lake Drive,
Milwaukee, Wis.
Filed Aug. 2, 1963, Ser. No. 299,568
5 Claims. (Cl. 10—141)

This invention relates to a tap for cutting internal screw threads.

When tapping acme or square threads of substantial depth in stainless steel or other metal, a heavy torque is frequently encountered which produces chattering. In some situations the torque may be so great that the tap will jam or break off, in which case the workpiece is generally scrapped. The heavy torque, which results in jamming and breaking of taps, substantially increases the time and cost factor for the overall tapping operation.

The present invention relates to a tap having an improved tooth design which reduces torque and chatter and provides a longer tap life. More specifically, the tap includes a series of longitudinally extending lands which are separated by flutes or grooves. Each land is provided with a series of teeth, and the teeth on the adjacent lands are in a spiral pattern.

Each land contains a series of pilot teeth, a series of cutting teeth, a series of cleaning teeth and a series of sizing teeth. The outer surface or crest of each cutting tooth is notched or relieved so that the cutting edge of the tooth constitutes approximately one-half of the width of the thread to be cut. The next succeeding cutting tooth on the adjacent land is notched on the opposite side so that in combination, the two cutting teeth will cut a full width thread. The cutting teeth are followed by a series of cleaning teeth, and each tooth has a substantially flat, non-tapered crest. The cleaning teeth serve to remove the chips from the cut thread. This arrangement of a series of cutting teeth followed by a series of cleaning teeth can be repeated throughout the length of the tap. Following the last series of cutting teeth, a series of sizing teeth are provided which serve to size the thread to proper dimension.

In the tooth design of the invention, each cutting tooth cuts only approximately half the width of the thread and the next succeeding cutting tooth in the thread spiral cuts the other half of the thread. This results in a considerable reduction in torque on the tap and eliminates chatter.

Moreover, the cutting teeth are arranged so that only one series of cutting teeth will be engaged with the workpiece at any one time. As the first series of cutting teeth pass through the workpiece, the second series of cutting teeth will engage the workpiece so that at any particular time there are a minimum number of cutting teeth in contact with the piece.

The tooth design of the invention provides chips of proper size which minimizes the jamming of chips in the grooves and thereby reduces torque. In addition, the tooth design eliminates burrs and sharp edges along the tapped hole.

In a modified form of the invention, there are three distinct tooth forms which alternate along the thread spiral. In this design, a notched cutting tooth having an outer surface or crest approximately one-half the width of the thread, is followed by a second cutting tooth. The crest of the second cutting tooth is notched on the opposite side so that the two cutting teeth in combination, will cut the full thread width. The cutting teeth are followed by a cleaning tooth which removes the chips from the cut thread. This arrangement of two cutting teeth followed by a cleaning tooth is continued along the thread spiral. As in the case of the first embodiment, each cutting tooth cuts a chip approximately one-half the width of the thread which provides a chip of better proportions and substantially reduces the torque on the tap and eliminates chatter.

Other objects and advantages will appear in the course of the following description.

The drawings illustrate the best mode presently contemplated of carrying out the invention.

In the drawings:
FIG. 1 is a plan view of the tap of the invention;
FIG. 2 is a section taken along line 2—2 of FIG. 1;
FIG. 3 is a diagrammatic representation showing two cutting teeth along the thread spiral; and
FIG. 4 is a diagrammatic representation of a modified form of the tap showing the tooth arrangement in schematic form.

The drawings illustrate a tap for cutting a square or acme thread in metal, such as carbon steel, stainless steel, or the like. The tap comprises a series of longitudinally extending lands 1 which are separated by grooves or flutes 2. Each land 1 is provided with a series of teeth which are arranged in spiral form. As best shown in FIG. 1, each land includes a series of pilot teeth 3, a first series of cutting teeth 4, a series of cleaning teeth 5, a second series of cutting teeth 6 and a series of sizing teeth 7.

The crests of the pilot teeth 3 are substantially flat in a longitudinal direction, as shown in FIG. 2. The pilot teeth serve to initially engage the hole in the workpiece and guide the tap into the hole. In the case where a series of progressively larger taps are used, the pilot teeth 3 will engage the thread formed by the previous tap in the series and thus the pilot teeth are formed with a diameter slightly less than the diameter of the sizing teeth on the previous tap.

The crest 8 of each cutting tooth 4 is provided with a notch or relief 9 so that the crest is from 40 to 60% of the width of the thread to be cut. As best shown in FIG. 3, the cutting teeth 4 of one land are notched on one side while the cutting teeth on the adjacent lands are notched on the opposite side thus, each alternate cutting tooth 4 along the thread spiral is notched on the opposite side so that one tooth will remove a chip from a corner of the thread and the next succeeding tooth 4 along the thread spiral will remove a chip from the opposite corner of the thread. The two successive cutting teeth along the spiral thread, in combination, will cut the entire thread width.

As shown in the drawings, there are three cutting teeth 4 associated with each land 1, making a total of 12 cutting teeth in the first series. The crest 8 of each cutting tooth is tapered longitudinally with the degree of taper depending on the depth and pitch of the thread.

The crests of the cleaning teeth 5 are substantially the full width of the thread and are generally flat or non-tapered in a direction longitudinally of the tap. The cleaning teeth 5 have a major diameter of about 0.001 to 0.003 inch less than the major diameter of last preceding cutting tooth 4. The cleaning teeth 5 merely serve to remove the chips from the thread which have been cut by the preceding cutting teeth 4. While the drawings show three cleaning teeth 5 associated with each land 1, any number of cleaning teeth can be used with the specific number depending largely on the depth of the hole to be tapped.

The cutting teeth 6 are similar in structure to cutting teeth 4. The crests 10 of cutting teeth 6 are provided with notches or recesses 11 similar to the notches 9 of cutting teeth 4. Again, the crests 10 of the cutting teeth are tapered in an axial direction with respect to the tap. As in the case of the teeth 4, each alternate tooth in the thread spiral is notched on the opposite side so that each tooth 6 will cut a chip which is approximately one-half of the width of the thread. Generally speaking, the crest 10 of any cutting tooth 6 can be from 40 to 60% of the thread width, as long as the tooth in combination with the next succeeding tooth in the thread spiral, cuts the entire thread width.

The teeth 7, which follow the cutting teeth 6, serve to size the thread to an accurate dimension. The crests of the sizing teeth 7 are the full width of the thread and are not tapered axially, but again are generally parallel to the axis of the tap.

The tap is designed so that only one series of cutting teeth is engaged with the workpiece at any one time. For example, the cutting teeth 6 do not enter the hole until the cutting teeth 4 are out of the hole, so that a maximum of 12 cutting teeth of one series are in engagement with the workpiece at any one time. As only a small number of cutting teeth of minimum width are in contact with the workpiece, the torque is substantially reduced over that of conventional tap designs. With the present tap, it is possible to cut a chip having a thickness of 0.002 inch which is approximately twice as thick as the chip thickness cut by a conventional tap and yet the torque will be only ⅓ or ¼ of the torque encountered with the conventional tap. In addition, the use of the half-width cutting teeth produces a chip size which can be readily removed from the thread by the cleaning teeth 5 to thereby eliminate jamming of the tap.

As heavy torque is eliminated, there is no chatter resulting from the use of the tap and the tap life is considerably extended.

FIG. 4 shows a modified form of the invention in which the teeth are shown in diagrammatic form. The dashed lines in FIG. 4 indicate the thread spiral. As in the case of the first embodiment, the tap consists of four lands 11-14 which are separated by grooves or flutes, not shown.

A series of pilot teeth 15-18 are provided along the thread spiral with one pilot tooth being provided on each land 11-14. Following the pilot teeth along the thread spiral is a cutting tooth 19 on land 11. As in the case of the first embodiment, the outer surface or crest of the cutting tooth 19 is notched so that the crest is approximately 40 to 60% of the width of the thread to be cut. The outer surface of the cutting tooth 19 is also provided with the desired axial taper.

A second cutting tooth 20 follows the first cutting tooth 19 along the thread spiral and cutting tooth 20 is notched on the opposite side from that of tooth 19 so that in combination, the teeth 19 and 20 cut the full thread width.

Following the cutting teeth 19 and 20 is a cleaning tooth 21 which removes the chips from the thread. The cleaning tooth 21 is similar to cleaning teeth 5 of the first embodiment and the crest of the tooth 21 is flat or non-tapered in an axial direction and the major diameter of the tooth 21 is slightly less than the major diameter of the preceding cutting teeth 19 and 20.

The pattern is repeated throughout the thread spiral with each cleaning tooth, such as 21, being followed in order by a cutting tooth 22, cutting tooth 23 and a cleaning tooth 24. The cutting teeth 22 and 23 are identical with the cutting teeth 19 and 20, respectively, and the cleaning tooth 24 is identical to cleaning tooth 21. The arrangement of two cutting teeth and a cleaning tooth is followed along the thread spiral by a series of sizing teeth 25, similar to teeth 7 of the first embodiment.

The tap design shown in FIG. 3 also substantially minimizes the torque over the conventional tap in view of the fact that the cutting is done by teeth having a minimum width and the cutting teeth are followed by a cleaning tooth which removes the chips and prevents jamming of the tap.

While the tap of the invention is particularly adaptable for stainless steel and other harder metals, it can be used with equal success on any type of metal, such as carbon steel, alloy steels, copper base alloys, and the like.

Various modes of carrying out the invention are contemplated as being within the scope of the following claims particularly pointing out and distinctly claiming the subject matter which is regarded as the invention.

I claim:

1. In a tap for cutting threads, a first cutting tooth extending along a thread spiral on the tap and having a crest tapered axially of the tap, said tooth having a recess in one side edge of the crest so that the crest has an axial dimension approximately one-half of the width of the thread to be cut, a second cutting tooth following the first cutting tooth along the thread spiral and having a crest tapered axially and having a recess in the opposite side edge so that the crest has an axial dimension approximately one-half of the width of the thread to be cut, and a third tooth following said second cutting tooth and having a crest extending generally parallel to the axis of the tap and having a major diameter less than the major diameter of said cutting teeth, said first and second cutting teeth, in combination, cutting the full thread width and the third tooth serving to remove the cut chips from the thread.

2. In a tap for cutting threads in metal stock, a first cutting tooth extending along the thread spiral on the tap and having a crest tapered axially of the tap, said cutting tooth having a recess in one side edge of the crest and extending along the thread spiral, a second cutting tooth following the first cutting tooth along the thread spiral and having a crest tapered axially of the tap and having a recess in the opposite side edge, and a cleaning tooth following said second cutting tooth along the thread spiral and having a crest substantially parallel to the axis of the tap, said cleaning tooth having a major diameter less than the major diameter of said cutting teeth, the axial dimensions of the crests of the first and second cutting teeth both being 40 to 60% of the axial dimension of the crest of the cleaning tooth and the combined axial dimensions of said first and second cutting teeth being at least as great as the axial dimension of the crest of the cleaning tooth so that the first and second cutting teeth in combination cut the full thread width.

3. A tap for cutting threads, comprising a series of lands extending longitudinally of the tap and separated by a series of flutes, each land having a plurality of teeth spaced longitudinally along the land and the teeth on adjacent lands being arranged in a thread spiral, said teeth including a series of cutting teeth on each land and a series of cleaning teeth on each land with said cleaning teeth following said cutting teeth along said land, each cutting tooth having a crest tapered axially of the tap and having a notch on one side of the crest, and each alternate cutting tooth in the thread spiral having said notch on the opposite side, each cleaning tooth having a major diameter less than the major diameter of the preceding cutting teeth, and the cleaning tooth serving to remove cut chips from the thread.

4. A tap for cutting threads, comprising a series of lands extending longitudinally of the tap and separated by a series of flutes, each land having a plurality of teeth spaced longitudinally along the land and the teeth on adjacent lands being arranged in a thread spiral, said teeth including a series of pilot teeth followed by a series of cutting teeth followed by a series of cleaning teeth followed by a series of sizing teeth, each cutting tooth having a crest tapered axially of the tap and having a recess in one side edge of the crest so that the crest has an axial dimension approximately one-half of the width of the thread to be cut, and each alternate cutting tooth in the thread spiral being recessed on the opposite side, said cleaning teeth having crests extending parallel to the axis of the tap and having a major diameter less than the preceding cutting teeth, said sizing teeth having crests extending generally parallel to the axis of the tap and having a major diameter substantially equal to the major diameter of said preceding cutting teeth, said sizing teeth serve to size the thread to the proper dimension.

5. The structure of claim 2 in which the arrangement of a first cutting tooth, a second cutting tooth and a cleaning tooth is repeated along the length of the tap.

References Cited by the Examiner

UNITED STATES PATENTS

| 1,520,714 | 12/1924 | Hanson | 10—141 |
| 1,613,224 | 1/1927 | Elstone | 10—141 |
| 1,846,509 | 2/1932 | Bridges | 10—141 |
| 3,021,538 | 2/1962 | Linley | 10—141 |

FOREIGN PATENTS 437,479   11/1926   Germany.

ANDREW R. JUHASZ, *Primary Examiner.*